(12) United States Patent
Sank et al.

(10) Patent No.: US 12,248,851 B1
(45) Date of Patent: Mar. 11, 2025

(54) THERMALIZATION AND ATTENUATION OF SIGNALS WITHIN QUANTUM COMPUTING SYSTEMS VIA DIRECTIONAL COUPLERS

(71) Applicant: Google LLC, Mountain View, CA (US)

(72) Inventors: Daniel Sank, Goleta, CA (US); Evan Robert Jeffrey, Santa Barbara, CA (US)

(73) Assignee: GOOGLE LLC, Mountain View, CA (US)

(*) Notice: Subject to any disclaimer, the term of this patent is extended or adjusted under 35 U.S.C. 154(b) by 22 days.

(21) Appl. No.: 18/450,996

(22) Filed: Aug. 16, 2023

(51) Int. Cl.
*G06N 10/40* (2022.01)

(52) U.S. Cl.
CPC .................. *G06N 10/40* (2022.01)

(58) Field of Classification Search
CPC .............. G06N 10/40; F17C 13/007; F17C 2270/0527; F17C 2223/0161; F25D 19/04
See application file for complete search history.

(56) References Cited

U.S. PATENT DOCUMENTS

| | | | |
|---|---|---|---|
| 2017/0257074 A1* | 9/2017 | Yeh | H01P 1/227 |
| 2020/0175412 A1* | 6/2020 | Mueller | G06N 10/00 |
| 2020/0313063 A1* | 10/2020 | Pollanen | H01P 3/06 |
| 2020/0333263 A1* | 10/2020 | Abdo | G06N 10/40 |
| 2022/0045416 A1* | 2/2022 | Naaman | H01P 1/20 |
| 2023/0307811 A1* | 9/2023 | Masluk | H01P 5/187 |
| 2024/0183604 A1* | 6/2024 | Buckley | F25D 19/04 |

* cited by examiner

*Primary Examiner* — Phong H Dang
(74) *Attorney, Agent, or Firm* — DORITY & MANNING P.A.

(57) ABSTRACT

This disclosure is directed to a quantum computing system (QCS) that includes a cryogenic sub-system, a signal-generating element, a first signal-splitting element, a first transmission path, a second transmission path, a third transmission path, and a quantum device. A first environment is located outside the cryogenic sub-system and a second environment is associated with the cryogenic sub-system. The signal-generating element generates a first signal. The first signal-splitting element is positioned within the second environment. The quantum device is positioned within the cryogenic sub-system. The first transmission path transmits the first signal from the signal-generating element to the first signal-splitting element. The first signal-splitting element subdivides the first signal into a second signal and a third signal. The third transmission transmits the third signal from the first signal-splitting element to the first environment. The second transmission path transmits the second signal from the first signal-splitting element to the quantum device.

20 Claims, 5 Drawing Sheets

THERMALIZATION AND ATTENUATION OF SIGNALS WITHIN QUANTUM COMPUTING SYSTEMS VIA DIRECTIONAL COUPLERS

FIELD

The present disclosure relates generally to quantum computing and information processing systems, and more particularly to thermalizing the control wiring for quantum devices (e.g., qubits) within quantum computing and information processing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a quantum computing system (QCS). The QCS may include a cryogenic sub-system, a signal-generating element, a first signal-splitting element, a first transmission path, a second transmission path, a third transmission path, and a quantum device. A first environment of the QCS is located outside the cryogenic sub-system and a second environment of the QCS is associated with the cryogenic sub-system. The signal-generating element is positioned in the first environment and generates a first signal. The first signal-splitting element is positioned within the second environment. The quantum device is positioned within the cryogenic sub-system. The first transmission path electromagnetically (EM) couples the signal-generating element and the first signal-splitting element. The first transmission path transmits the first signal from the signal-generating element to the first signal-splitting element. The first signal-splitting element subdivides the first signal into a second signal and a third signal. The third transmission path EM couples the first environment and the first signal-splitting element. The third transmission path transmits the third signal from the first signal-splitting element to the first environment. The second transmission path at least partially EM couples the first signal-splitting element and the quantum device. The second transmission path transmits the second signal away from the first signal-splitting element and at least partially enables providing at least a portion of the second signal to the quantum device.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
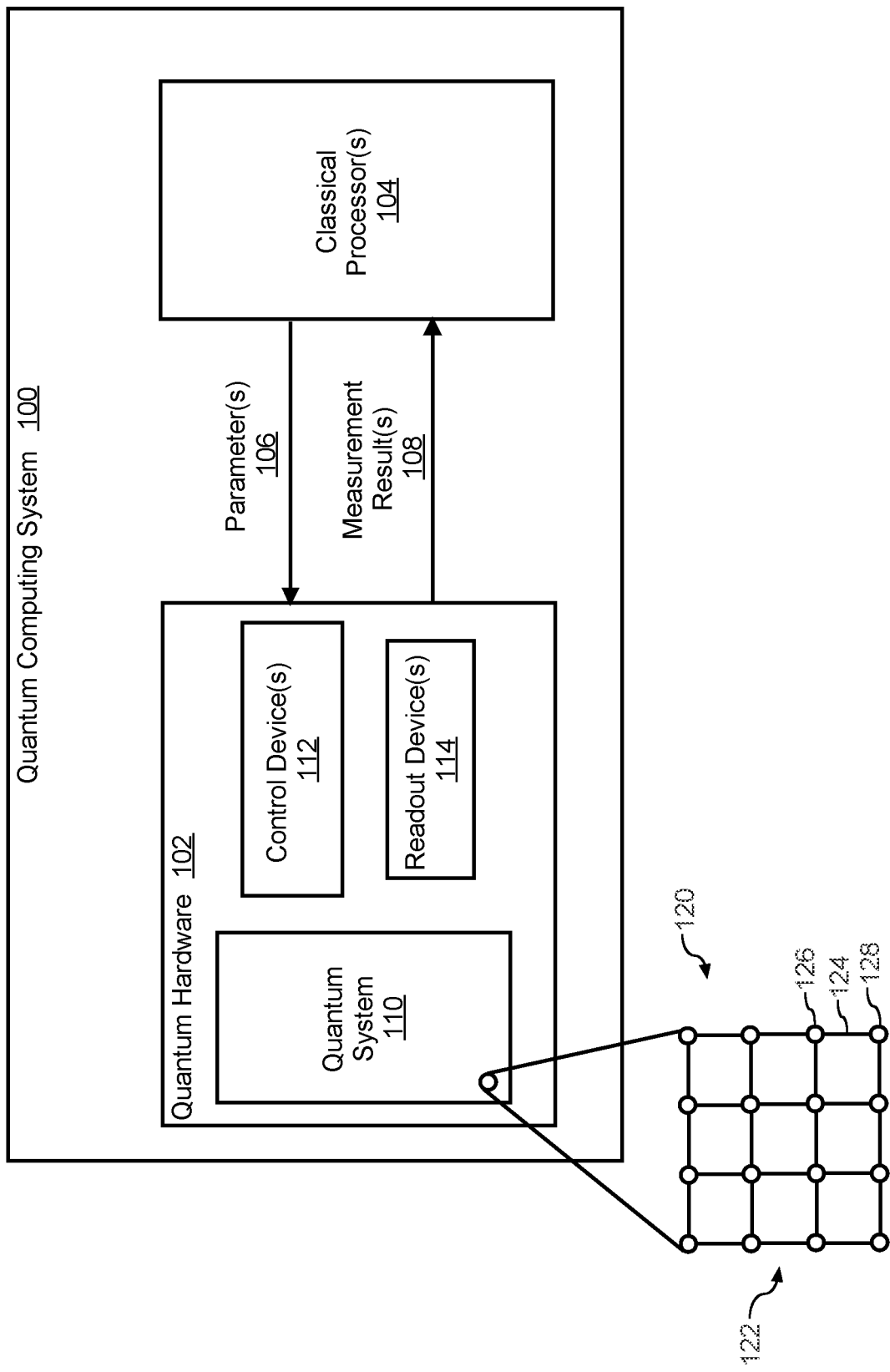
FIG. 1 depicts an example quantum computing system according to example embodiments of the present disclosure.

Example aspects of the present disclosure are directed to methods, architectures, and hardware configurations that enable thermalization and attenuation of signals within quantum computing and/or quantum information processing systems via signal-splitting elements (e.g., directional couplers). The signals to be thermalized and/or attenuated may include signals that are provided to various quantum devices (e.g., qubits and/or qubit couplers) of the quantum computing system (QCS). Because the signals may be used to operate and/or control the qubit devices, such signals may be referred to as control signals. The quantum devices may be positioned within a cryogenic system (or sub-system) of the QCS. Control signals may be generated via a signal-generation element of the QCS, which may be located outside of the cryogenic system. Because the quantum devices are within the cryogenic system and the signal-generating elements are outside of the cryogenic system, a control signal may pass through one or more cryogenic chambers. Accordingly, a control signal may travel from a higher temperature environment (e.g., a room temperature environment) into one or more colder environments. After the control signals have entered the colder cryogenic system, the signals may need to be thermalized and/or attenuated to remove noise associated with the higher temperature (e.g., room temperature) environment, as well as to reduce the power and/or amplitude of the signal, so that the thermalized and/or attenuated signal may be employed to operate the quantum devices at a lower temperature. If not removed and/or filtered, such room temperature noise may "swamp" the control signal within the cryogenic system.

By employing one or more signal-splitting elements, the control signal may be split into at least two (or more) signals within the cryogenic system. One of the two (or more) signals (that the room-temperature control signal has been split into) may be routed to the quantum device, while the other signal(s) may be rerouted to the room-temperature environment, where the heat associated with the returned signal(s) may be readily absorbed, without warming the cryogenic system.

Conventional thermalization and/or attenuation of the control signals typically involves dissipating power and/or heat associated with the control signals (via absorption of a significant portion of the signal) within the cryogenic system. Such signal absorption is typically accomplished via signal attenuators positioned within the cryogenic system. Signal attenuators (or other signal-absorbing elements) positioned within the cryogenic system generally absorb a portion of the signal's power and thus generate heat within the cryogenic system. That is, signal attenuators may effectively act as a power absorber within the cryogenic system. Absorbing signal power in the cryogenic system generates a significant amount of heat that may warm up the cryogenic system, disrupting the ability of the cryogenic system to maintain the colder temperature required for the coherent operation of the qubit devices. In addition, due to blackbody radiation, these absorbers radiate electromagnetic blackbody radiation with high emissivity to the quantum devices, which further degrades the operation of the quantum devices. In such absorption-based architectures, as the number of quantum devices scales, so too does the amount of heat load on the cryogenic system, and the amount of heat radiated to the quantum devices, resulting in loss of coherence of the quantum devices.

Rather than absorbing signals' power in the cryogenic system as conventional systems do, the various embodiments position signal-splitting elements within the cryogenic system. Such signal-splitting elements may include but are not otherwise limited to directional couplers. The control signal (e.g., a first signal) may be generated outside the cryogenic system (e.g., an ambient environment of the quantum computing system) and provided, as input, to a signal-splitting element positioned within the cryogenic system. The signal-splitting element may effectively subdivide, within the cryogenic system, the first signal into a second signal and a third signal. The second signal may be provided to the quantum device (or additional signal-splitting elements for further subdivisions before being provided to the quantum device), while the third signal is re-routed out of the cryogenic system and back into the quantum computing system's ambient environment. Thus, after the first signal is subdivided (or split), into the second and third signals, the second signal is effectively a thermalized and/or attenuated version of the first signal (e.g., the control signal), and it is this signal (or further subdivisions of this signal) that is provided to the quantum device. Because the third signal is re-routed out of the cryogenic system, the power of the first signal that was split into the third signal is not dissipated and/or absorbed within the cryogenic system. Rather, the power in the third signal may be safely absorbed in the ambient environment, outside of the cryogenic system.

Thus, in various embodiments, a QCS may include a cryogenic sub-system, a signal-generating element, a first signal-splitting element (e.g., a directional coupler), a first (signal) transmission path, a second (signal) transmission path, a quantum device (e.g., a qubit or a qubit coupler), and a third (signal) transmission path. There may be a first environment (e.g., a room temperature environment) that is outside the cryogenic sub-system. There may also be a second environment (e.g., an environment that is colder than room temperature) that is associated with the cryogenic sub-system. The signal-generating element may be positioned in the first environment and may generate a first signal (e.g., a qubit control signal). The first signal-splitting element may be positioned within the second environment. The first transmission path electromagnetically (EM) couples the signal-generating element and the first signal-splitting element. The first transmission path may transmit the first signal from the signal-generating element to the first signal-splitting element. The first signal-splitting element may subdivide the first signal into a second signal (e.g., an attenuated version of the control signal) and a third signal (e.g., the return signal). The third transmission path may EM couples the first environment and the first signal-splitting element. The third transmission path may transmit the third signal from the first signal-splitting element to the first environment. The quantum device may be positioned within the cryogenic sub-system. The second transmission path may at least partially EM couples the first signal-splitting element and the quantum device. The second transmission path may transmit the second signal away from the first signal-splitting element. The second transmission path may at least partially enable providing at least a portion of the second signal to the quantum device.

In some embodiments, the subdivision of the first signal into a second and third signal is an asymmetrical subdivision. That is, the second signal may have a first fraction of power associated with the first signal. The third signal may have a second fraction of power associated with the first signal. The first signal-splitting element may be an asymmetrical signal splitter such that the second fraction of power (of the third signal) associated with the first signal may be greater than the first fraction of power (of the second signal) associated with the first signal. For instance, with a directional coupler of a coupling factor of −20 dB, the power of the second signal is approximately 1% the power of the first signal and the power of the third signal (re-routed out of the cryogenic system) is approximately 99% of the power of the first signal. The coupling factor for the directional coupler may be selected depending upon how much signal attenuation is required for the application. As an alternative expression of a coupling factor, a signal-splitting element may be characterized by a splitting factor (or splitting ratio). For instance, in the above example, the splitting factor of the −20 dB directional coupler may be expressed as 1:99 (e.g., the ratio of the power of second signal to the power of the third signal).

In various embodiments, the cryogenic system may include multiple stages, with decreasing temperatures. For instance, a cryogenic system may include a first stage operated at a first temperature (e.g., 3 kelvins), which is colder than room temperature (e.g., approximately 300 kelvins), and a second stage that is operated at a second stage that is operated at a second temperature that is colder than the first temperature (e.g., 10 millikelvins), where the quantum devices are positioned in the second stage. The embodiments are not limited to cryogenic systems with two stages, and the cryogenic systems of the embodiments may include any number of stages, with the stages increasingly colder. The quantum devices may be stored in the coldest (or final) stage of the cryogenic system. In some embodiments, the control signal may be split (or subdivided) in one or more of the multiple stages of the cryogenic system.

For instance, in the above example, in a first cryogenic chamber associated with the first stage, a first signal-splitting element (with a coupling factor of −20 dB) may be split into a second signal (with 1% of the power of the first signal) and a third signal (with 99% of the power of the first signal). The third signal is re-routed out of the first cryogenic chamber and back into the room-temperature environment, such that 99% percent of the power of the first signal may be safely absorbed without heating up the environment of the first cryogenic chamber. A second signal-splitting element (with a coupling factor of −20 dB) and a quantum device are located in a second cryogenic chamber associated with the second stage of the cryogenic system. In some embodiments, the second cryogenic chamber may be located within the first cryogenic chamber of the first stage. In various embodiments, the coupling factor of the first and second signal-splitting elements need not be the same. The second signal may pass through the second cryogenic chamber and be provided as input to the second signal-splitting element. The second signal-splitting element may subdivide the second signal into a fourth signal (having 0.01% of the power of the first signal) and a fifth signal (having 0.99% of the power of the first signal). The fourth signal may be provided to the quantum device and the fifth signal may be re-routed to the first cryogenic chamber. Because the fifth signal has less than 1% of the power of the first signal, the power of the fifth signal may be readily absorbed within the first cryogenic system, without substantially heating up the first cryogenic chamber. In other embodiments, the fifth signal may be re-routed back to the room-temperature environment, for absorption there.

Note that the embodiments are not so limited, and in some embodiments with two or more stages (or two or more cryogenic chambers), as a signal passes from one cryogenic stage to another stage (or from one cryogenic chamber to another chamber), the signal need not be subdivided (or split) in every chamber, depending on the needs for signal thermalization and/or attenuation. For instance, in the above example, the first signal may be split in the first cryogenic chamber, and the second signal may be provided to the quantum device within the second cryogenic chamber, without further subdivisions (or splits) in the second cryogenic chamber. In another embodiment, the first signal may pass into the first cryogenic chamber and then into the second cryogenic chamber, without being subdivided in the first chamber. The first signal may be subdivided via a signal-splitting element in the second cryogenic chamber into a second and third signal. The second signal may be provided to the quantum device and the third chamber may be re-routed to the first cryogenic chamber for absorption (or re-routing back to the ambient environment). In other embodiments with three cryogenic stages, the signal may be split in each of the 3 stages, in two of the three stages, or in one of the three stages. This logic may be extended for any number of stages of a cryogenic system. Accordingly, a cryogenic system may include N stages, where N is any positive integer. A control signal may be iteratively subdivided L times (via L signal-splitting elements), where L is a positive integer and L≤N. If each iterative subdivision of the control signal is performed in a separate stage of the cryogenic system, there are $\binom{N}{L}$ possible combinations of stages for the subdivisions.

Aspects of the present disclosure provide a number of technical effects and benefits. For instance, subdividing a first signal into a second signal and a third signal, and re-routing the third signal into a room temperature environment, rather than resistively absorbing a portion of the first signal in the cryogenic sub-system does not put a heat load on the cryogenic sub-system. Accordingly, the embodiments enable scaling the number of quantum devices within the cryogenic sub-system, by at least on several orders of magnitude, without radiating significant amounts of heat into the cryogenic sub-system. As such, maintaining coherence among the qubits and/or qubit couplers may be achieved. Accordingly, scalable quantum computation and quantum information processing is achievable via the various embodiments.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the |0> and |1> states of an element of the quantum system, such as a qubit, to measure the state of the element (e.g., the qubit). For example, the resonance frequency of a readout resonator can take on different values when a qubit is in the state |0> or the state |1>, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit t. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

Figure 2:
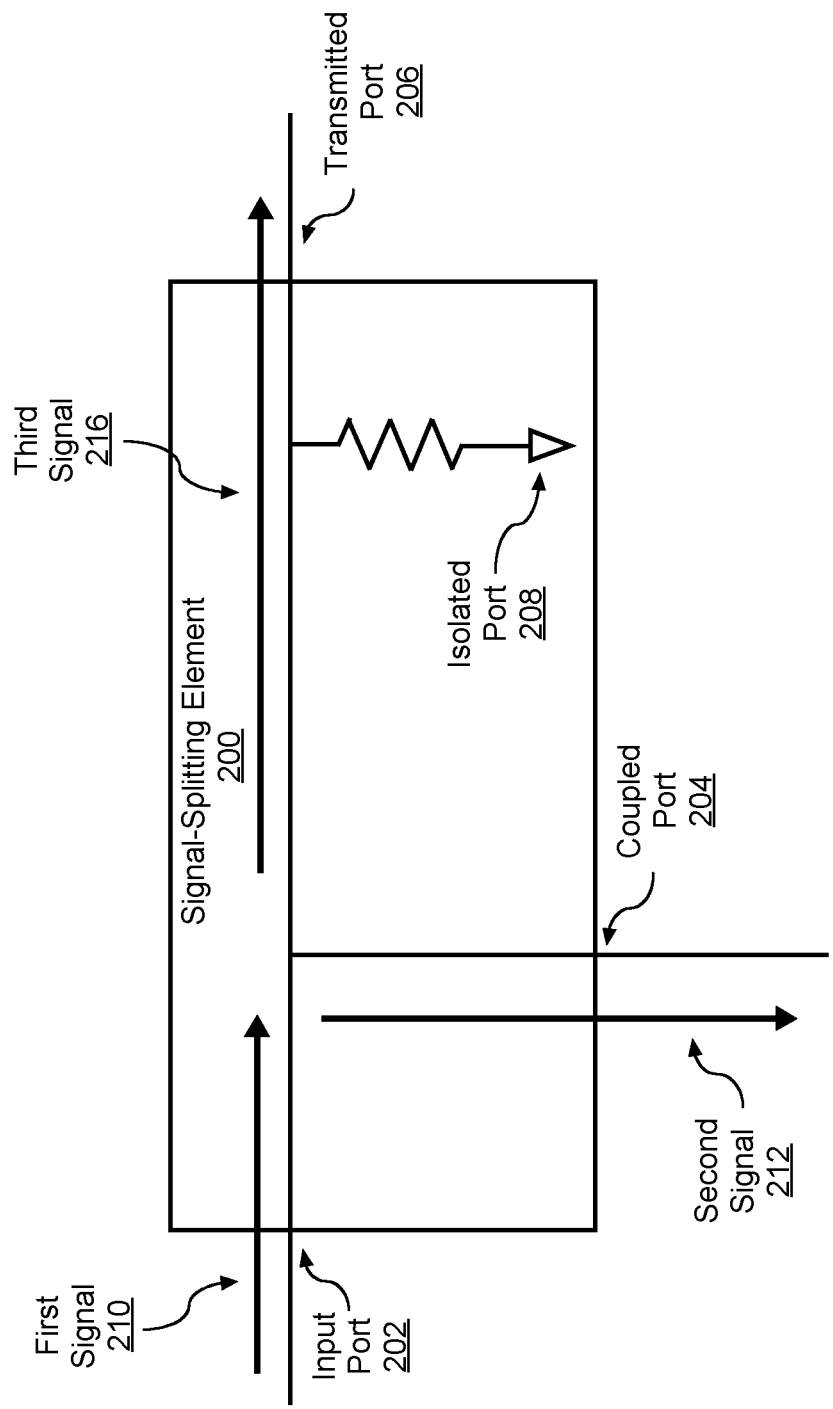
FIG. 2 provides a schematic view of a signal-splitting element, according to various embodiments.

FIG. 2 provides a schematic view of a signal-splitting element 200, according to various embodiments. Signal-splitting element 200 may be, but is not limited to, a directional coupler. In the non-limiting embodiment shown in FIG. 2, the signal-splitting element 200 includes an input port 202, a coupled port 204, and a transmitted port 206. The input port 202 may receive a first signal 210. The first signal 210 may be a radiofrequency (RF) or a microwave signal. The signal-splitting element 200 subdivides (or splits) the first signal 210 into a second signal 212 and a third signal 216. The subdivision of the power of the first signal 210 being provided to the second signal 212 and the third signal 326 is characterized by a coupling factor of the signal-splitting element 200.

In various embodiments, the subdivision of the first signal 210 into the second signal 212 and the third signal 326 is an asymmetrical subdivision. That is, the second signal 324 may have a first fraction of power associated with the first signal 322. The third signal 326 may have a second fraction of power associated with the first signal 322. The first signal-splitting element 320 may be an asymmetrical signal splitter such that the second fraction of power (of the third signal 326) associated with the first signal 322 may be greater than the first fraction of power (of the second signal 324) associated with the first signal. For instance, when the signal-splitting element 200 has a coupling factor of −20 dB, the power of the second signal 212 is approximately 1% the power of the first signal 210 and the power of the third signal 216 is approximately 99% of the power of the first signal 210. The coupling factor for the signal-splitting element 200 may be selected depending upon how much signal attenuation is required for the application. As an alternative expression of a coupling factor, the signal-splitting element 200 may be characterized by a splitting factor (or splitting ratio). For instance, in the above example, the splitting factor of the −20 dB of the signal-splitting element 200 may be expressed as 1:99 (e.g., the ratio of the power of second signal to the power of the third signal)

The signal-splitting element 200 provides the second signal 212 as output via the coupled port 204. The signal-splitting element 200 provides the third signal 216 as output via the transmitted port 206. In non-limiting embodiments, the signal-splitting element 200 may include an isolated port 208 that is terminated internally within the signal-splitting element 200. At least a portion of any energy flowing in the reverse direction to of the first signal 210 (e.g., a signal flowing into the transmitted port 206) may be isolated within the signal-splitting element 200 may be isolated by the internally terminated isolated port 208.

Figure 3:
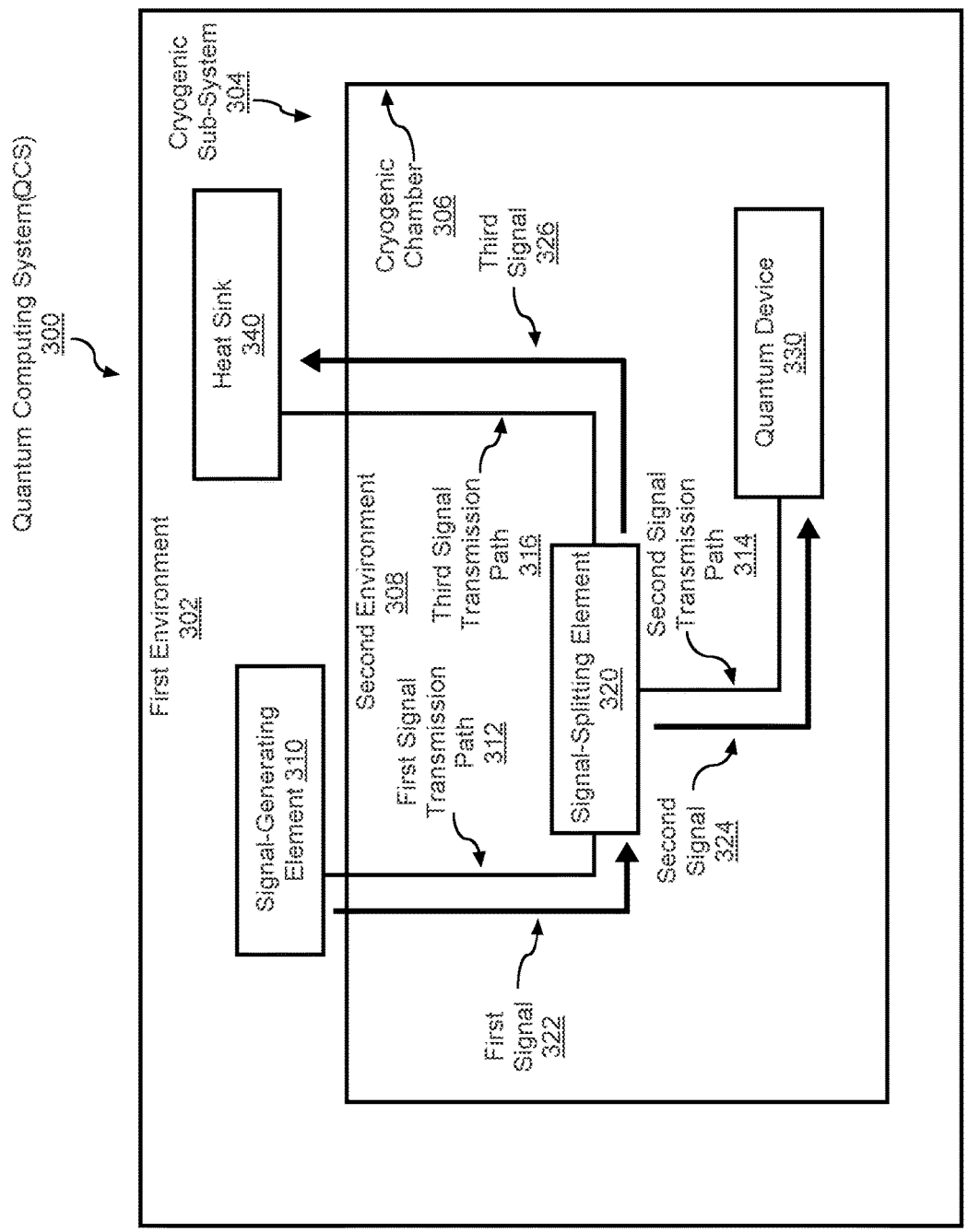
FIG. 3 depicts one example quantum computing system that can be used to implement the methods and operations according to example aspects of the present disclosure.

FIG. 3 depicts one example quantum computing system (QCS) 300 that can be used to implement the methods and operations according to example aspects of the present disclosure. Other quantum computing systems can be used without deviating from the scope of the present disclosure. QCS 300 includes a cryogenic sub-system 304, a signal-generating element 310, a first signal-splitting element 320, a first signal transmission path 312, a second signal transmission path 314, a third signal transmission path 316, a quantum device 330, and a heat sink 340. The cryogenic sub-system 304 may have a cryogenic chamber 304. A first environment 302 of the QCS 300 may be outside the cryogenic sub-system 304. A second environment 308 may be associated with the cryogenic sub-system 304. For example, the second environment 308 may be located within the cryogenic chamber 306 and the first environment 302 may be located outside the cryogenic chamber 306. The signal-generating element 310 may be positioned within the first environment 302. In some embodiments, the signal-generating element 310 may be a signal generating. The signal-generating element 310 may generate a first signal 322. The first signal 322 may be a control signal (e.g., an RF or a microwave signal). The first signal-splitting element 320 may be positioned within the second environment 308. The first signal-splitting element 320 may be similar to the signal-splitting element 200 of FIG. 2. In some embodiments the heat sink 340 is positioned within the first environment 302.

The first signal transmission path 312 electromagnetically (EM) couples the signal-generating element 310 and the first signal-splitting element 320. The first signal transmission path 312 transmits the first signal 312 from the signal-generating element 310 to the first signal-splitting element 320. Accordingly, the first signal transmission path 312 may feed-thru the cryogenic chamber 306. Being similar to the signal-splitting element 200 of FIG. 2, the first signal-splitting element 320 subdivides the first signal 310 into a second signal 324 and a third signal 326. The third signal transmission path 316 EM couples the first environment 302 and the first signal-splitting element 320. Accordingly, the third signal transmission path 316 may feed-thru the cryogenic chamber 306. The third signal transmission path 316 transmits the third signal 326 from the first signal-splitting element 320 to the first environment 302. In some embodiments, the third transmission path 316 EM couples the first signal-splitting element 320 and the heat sink 340. Thus, in these embodiments, the third signal transmission path 316 transmits the third signal 326 from the first signal-splitting element 320 to heat sink 340.

The quantum device 330 may be positioned within the cryogenic sub-system 304. The second signal transmission path 314 at least partially EM couples the first signal-splitting element 320 and the quantum device 330. The second signal transmission path 314 transmits the second signal 324 away from the first signal-splitting element 320. The second signal transmission path 314 at least partially enables providing at least a portion of the second signal 324 to the quantum device 330.

In various embodiments, the first signal-splitting element 320 is a directional coupler. As shown in the signal-splitting element 200 of FIG. 2, the directional coupler may include an input port (e.g., input port 202 of signal-splitting element 200) that EM couples the first signal transmission path 312 and the directional coupler. The directional coupler may also include a transmitted port (e.g., transmitted port 206 of signal-splitting element 200) that EM couples the third signal transmission path 316 and the directional coupler. The directional coupler may additionally include a coupled port (e.g., coupled port 204 of signal-splitting element 200) that EM couples the second signal transmission path 314 and the directional coupler. In at least one embodiment, the directional coupler further includes an isolated port (e.g., isolated port 208 of signal-splitting element 200). The isolated port may be internally terminated within the directional coupler. In some embodiments, the quantum device 330 may be a qubit. In other embodiments, the quantum device 330 may be a qubit coupler. The qubit device 330 may be a superconducting device.

Figure 4:
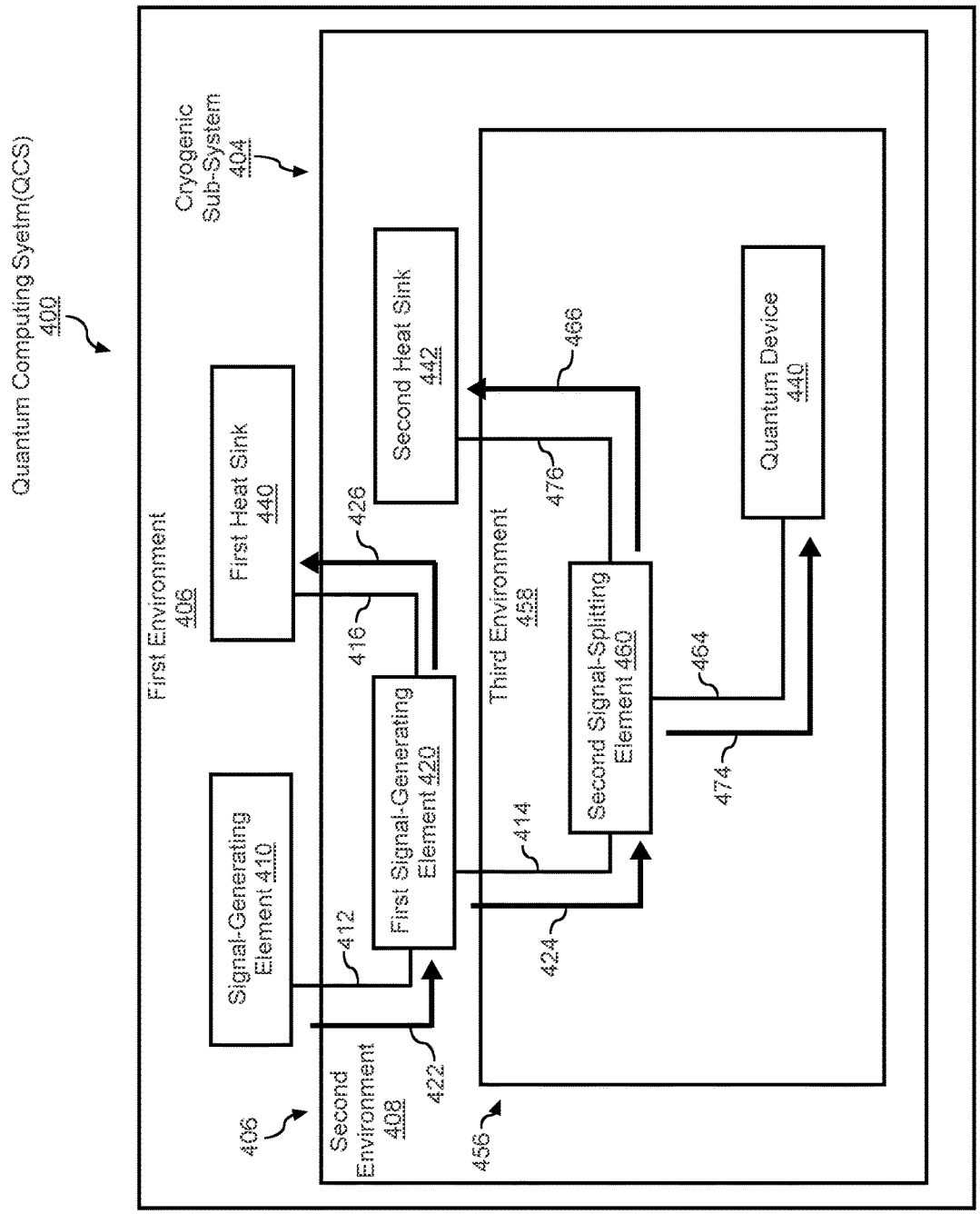
FIG. 4 depicts another example quantum computing system that can be used to implement the methods and operations according to example aspects of the present disclosure.

FIG. 4 depicts another example quantum computing system (QCS) 400 that can be used to implement the methods and operations according to example aspects of the present disclosure. Other quantum computing systems can be used without deviating from the scope of the present disclosure. QCS 400 may include similar components as QCS 300 of FIG. 3. For instance, QCS 400 includes a cryogenic sub-system 404, a signal-generating element 410, a first signal-splitting element 420, and a quantum device 430. The quantum device 430 may be similar to the quantum device 330 of QCS 300. The cryogenic sub-system 404 of QCS 400 includes a first stage with a first cryogenic chamber 406. The cryogenic sub-system 404 may also include a second stage with a second cryogenic chamber 456. In at least one non-limiting embodiment, the second cryogenic chamber 456 is positioned within the first cryogenic chamber 406. A first environment 402 of the QCS 400 is outside the first cryogenic chamber 406 (and outside the second cryogenic chamber 456). A second environment 408 is within the first cryogenic chamber 406, but outside the second cryogenic chamber 456. That is, the first cryogenic chamber 406 encloses the second environment 408. A third environment 458 is within the second cryogenic chamber 456. The second cryogenic chamber 456 encloses the third environment 458.

The signal-generating element 410 is positioned in the first environment 402. The signal generating element 410 may be similar to signal-generating element 310 of QCS 300 of FIG. 3. A first heat sink 440 is positioned in the first environment 402, similarly to heat signal 340 of QCS 300. The first signal-splitting element 420 and a second heat sink 442 are positioned in the second environment 408. Each of the first signal-splitting element 420 and the second signal-splitting element 460 may be similar to signal-splitting element 200 of FIG. 2. For instance, each of the first signal-splitting element 420 and the second signal-splitting element 460 may be a directional coupler. Accordingly, the first signal-splitting element 420 may be a first directional coupler and the second signal-splitting element 460 may be a second directional coupler. In some embodiments, the coupling factor of the first signal-splitting element 420 may be equivalent (or at least similar) to the coupling factor of the second signal-splitting element 460. In other embodiments, the coupling factor of the first signal-splitting element 420 may be dissimilar to the coupling factor of the second signal-splitting element 460.

A first signal transmission path 412 electromagnetically (EM) couples the signal-generating element 410 and the first signal-splitting element 420. A second signal transmission path 414 may EM couple the first signal-splitting element 420 and the second signal-splitting element 460. Similar to QCS 300, a third signal transmission path 416 may EM couple the first signal-splitting element 420 and the first heat sink 440. A fourth signal transmission path 464 may EM couple the second signal-splitting element 460 and the quantum device 430. A fifth signal transmission path 466 EM couples the second signal-splitting element 460 and the second heat sink 442. Accordingly, the first signal transmission path 412 and the third signal transmission path 416 may feed-thru the first cryogenic chamber 406. The second signal transmission path 414 and the fifth signal transmission path 466 may feed-thru the second cryogenic chamber 456.

In various embodiments, the signal-generating element 410 generates a first signal 422 (e.g., an RF or microwave control signal). The first signal transmission path 412 transmits the first signal 422 from the signal-generating element 410 to the first signal-splitting element 420. The first signal-splitting element 420 subdivides the first signal 422 into a second signal 424 and a third signal 426. The third signal transmission path 416 transmits the third signal 426 from the first signal-splitting element 420 to the first environment 402. For instance, the third signal transmission path 416 may transmit the third signal 426 from the first signal-splitting element 420 to the first heat sink 440 positioned in the first environment 402. The second signal transmission path 414 transmits the second signal 424 away from the first signal-splitting element 420 and at least partially enables providing at least a portion of the second signal 424 to the quantum device 430. More particularly, the second signal transmission path 414 transmits the second signal 424 from the first signal-splitting element 420 to the second signal-splitting element 460.

The second signal-splitting element 460 subdivides the second signal 424 into a fourth signal 474 and a fifth signal 476. The fourth signal transmission path 464 transmits the fourth signal 474 from the second signal-splitting element 560 to the quantum device 430. The fifth signal transmission path 466 transmits the fifth signal 476 from the second signal-splitting element 460 to the second environment 408. For instance, the fifth signal transmission path 466 may transmit the fifth signal 476 from the second signal-splitting element 460 to the second heat sink 442 positioned in the second environment 408.

The first stage of the cryogenic sub-system 404 is operated at a first temperature. The second stage of the cryogenic sub-system 404 is operated at a second temperature that is less than the first temperature of the first stage. Accordingly, the second environment 408 may be the first temperature, and the third environment may be at the second temperature that is less than the first temperature of the second environment 408. The first environment 402 may be at another temperature (e.g., room temperature). In a non-embodiment, the temperature of the first environment 408 is approximately 300 kelvins or greater, the first temperature of the first stage of the cryogenic sub-system 404 (or the second environment 408) is approximately 3 kelvins, and second temperature of the second stage of the cryogenic sub-system 404 (or the third environment 458) is approximately 20 millikelvins or less.

In the non-limiting embodiment shown in FIG. 4, the second cryogenic chamber 456 is positioned within the first cryogenic chamber 406. However, the embodiments are not so limited, and the chambers of the stages need not be nested, as in a Russian doll configuration. Also note that the embodiments are not limited to two cryogenic stages, and the cryogenic sub-system 404 may include more than two stages. Furthermore, as shown in the non-limiting embodiment of FIG. 4, the first signal-splitting element 420 is positioned in the first cryogenic chamber 406 and the quantum device 430 is positioned within the second cryogenic chamber 460. The embodiments are not so limited, in another embodiment (not shown if FIG. 4), the first signal-splitting element 420 is positioned in the second cryogenic chamber 456 and the quantum device 430 is positioned within the second cryogenic chamber 456.

Methods

Figure 5:
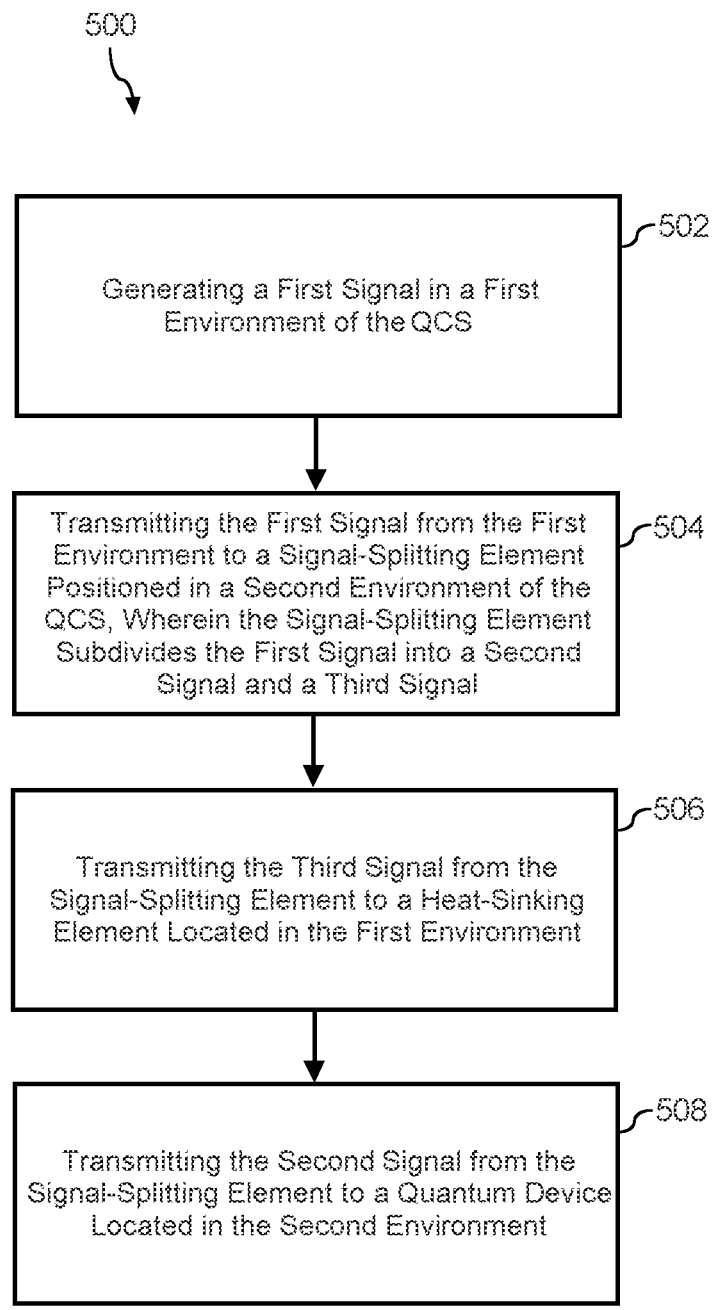
FIG. 5 illustrates a method for operating a quantum computing system, according to various embodiments.

FIG. 5 illustrates a method 500 for operating a quantum computing system, according to various embodiments. FIG. 5 depict operations performed in a particular order for purposes of illustration and discussion. Those of ordinary skill in the art, using the disclosures provided herein, will understand that operations of any of the methods described herein can be expanded, include steps not illustrated, omitted, rearranged, and/or modified in various ways without deviating from the scope of the present disclosure. Method 500 of FIG. 5 may be implemented using any suitable quantum computing system, such as the systems described in FIGS. 1, 3, and 4.

Method 500 begins at block 502, where a first signal (e.g., first signal 322 of FIG. 3) is generated in a first environment (e.g., first environment 302 of FIG. 3) of the QCS (e.g., QCS 300 of FIG. 3). At block 504, the first signal is transmitted from the first environment to a signal-splitting element (e.g., signal-splitting element 320 of FIG. 3) positioned in a second environment (e.g., second environment 308 of FIG. 3) of the QCS. The signal-splitting element may subdivide the first signal into a second signal (e.g., second signal 324 of FIG. 3) and a third signal (e.g., third signal 326 of FIG. 3). At block 506, the third signal is transmitted from the signal-splitting element to a heat-sinking element (e.g., heat sink 340 of FIG. 3) located in the first environment. At block 508, the second signal is transmitted from the signal-splitting element to a quantum device (e.g., quantum device 330 of FIG. 3) located in the second environment.

Other Embodiments

Another embodiment is directed to a cryogenic system. The cryogenic system may include a cryogenic chamber, a signal-generating element that generates a first signal, a heat-absorbing element positioned outside the cryogenic chamber, a signal-splitting element positioned in the cryogenic chamber, and a superconducting element positioned in the cryogenic chamber. The cryogenic system may further include a first signal transmission path that transmits the first signal from the signal-generating element to the first signal-splitting element. The first signal-splitting element subdivides the first signal into a second signal and a third signal. The cryogenic system may further include a second signal transmission path that transmits the second signal away from the first signal-splitting element and at least partially enables providing at least a portion of the second signal to the quantum device. The cryogenic system may further include a third signal transmission path that transmits the third signal from the first signal-splitting element to the heat-absorbing element. The superconducting element may be at least one of a qubit or a qubit coupler.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A quantum computing system (QCS) comprising:
   a cryogenic sub-system, wherein a first environment is outside the cryogenic sub-system and a second environment is associated with the cryogenic sub-system;
   a signal-generating element, positioned in the first environment, that generates a first signal;
   a first signal-splitting element positioned within the second environment;
   a first transmission path that electromagnetically (EM) couples the signal-generating element and the first signal-splitting element such that the first transmission path transmits the first signal from the signal-generating element to the first signal-splitting element and the first signal-splitting element subdivides the first signal into a second signal and a third signal;
   a third transmission path that EM couples the first environment and the first signal-splitting element such that the third transmission path transmits the third signal from the first signal-splitting element to the first environment;
   a quantum device positioned within the cryogenic sub-system; and
   a second transmission path that at least partially EM couples the first signal-splitting element and the quantum device such that the second transmission path transmits the second signal away from the first signal-splitting element and at least partially provides at least a portion of the second signal to the quantum device.

2. The quantum computing system of claim 1, wherein the first signal-splitting element is a directional coupler.

3. The quantum computing system of claim 2, wherein the directional coupler comprises an input port that EM couples the first transmission path and the directional coupler, a transmitted port that EM couples the third transmission path and the directional coupler, and a coupled port that EM couples the second transmission path and the directional coupler.

4. The quantum computing system of claim 3, wherein the directional coupler further comprises an isolated port.

5. The quantum computing system of claim 4, wherein the isolated port is terminated internally within the directional coupler.

6. The quantum computing system of claim 1, wherein the quantum device is a qubit.

7. The quantum computing system of claim 1, wherein the quantum device is a qubit coupler.

8. The quantum computing system of claim 1, wherein the cryogenic sub-system comprises a first stage that includes a first cryogenic chamber that encloses the second environment, and the first stage is operated at a first temperature.

9. The quantum computing system of claim 8, wherein the cryogenic sub-system further comprises a second stage that includes a second cryogenic chamber that encloses a third environment, and the second stage is operated at a second temperature that is less than the first temperature.

10. The quantum computing system of claim 9, wherein a temperature of the first environment is approximately 300 kelvins or greater, the first temperature of the first stage of the cryogenic sub-system is approximately 3 kelvins, and second temperature of the second stage of the cryogenic sub-system is approximately 20 millikelvins or less.

11. The quantum computing system of claim 9, wherein the second cryogenic chamber is positioned within the first cryogenic chamber.

12. The quantum computing system of claim 9, wherein the first signal-splitting element is positioned in the second cryogenic chamber and the quantum device is positioned within the second cryogenic chamber.

13. The quantum computing system of claim 9, wherein the first signal-splitting element is positioned in the first cryogenic chamber and the quantum device is positioned within the second cryogenic chamber.

14. The quantum computing system of claim 9, wherein the QCS further comprises:
- a second signal-splitting element positioned within the second cryogenic chamber, wherein the third transmission path EM couples the first signal-splitting element and the second signal-splitting element such that the third transmission path transmits the second signal from the first signal-splitting element to the second signal-splitting element, and the second signal-splitting element subdivides the second signal into a fourth signal and a fifth signal;
- a fifth transmission path that EM couples the second environment and the second signal-splitting element such that the fifth transmission path transmits the fifth signal from the second signal-splitting element to the second environment; and
- a fourth transmission path that EM couples the second signal-splitting element and the quantum device such that the fourth transmission path transmits the fourth signal from the second signal-splitting element to the quantum device.

15. The quantum computing system of claim 14, wherein the first signal-splitting element is a first directional coupler and the second signal-splitting element is a second directional coupler.

16. The quantum computing system of claim 1, wherein the second signal has a first fraction of power associated with the first signal, the third signal has a second fraction of power associated with the first signal, and the first signal-splitting element is an asymmetrical signal splitter such that the second fraction of power associated with the first signal is greater than the first fraction of power associated with the first signal.

17. A method for operating a quantum computing system (QCS), the method comprising:
- generating a first signal in a first environment of the QCS;
- transmitting the first signal from the first environment to a signal-splitting element positioned in a second environment of the QCS, wherein the signal-splitting element subdivides the first signal into a second signal and a third signal;
- transmitting the third signal from the signal-splitting element to a heat-sinking element located in the first environment; and
- transmitting the second signal from the signal-splitting element to a quantum device located in the second environment.

18. The method of claim 17, wherein the quantum device is at least one of a qubit or a qubit coupler.

19. A cryogenic system comprising:
- a cryogenic chamber;
- a signal-generating element that generates a first signal;
- a heat-absorbing element positioned outside the cryogenic chamber;
- a signal-splitting element positioned in the cryogenic chamber;
- a superconducting element positioned in the cryogenic chamber;
- a first signal transmission path that transmits the first signal from the signal-generating element to the first signal-splitting element and the first signal-splitting element subdivides the first signal into a second signal and a third signal;
- a second signal transmission path that transmits the second signal away from the first signal-splitting element and at least partially enables providing at least a portion of the second signal to the superconducting device; and
- a third signal transmission path that transmits the third signal from the first signal-splitting element to the heat-absorbing element.

20. The cryogenic system of claim 19, wherein the superconducting element is at least one of a qubit or a qubit coupler.

* * * * *